United States Patent
Yan et al.

(10) Patent No.: US 10,640,383 B2
(45) Date of Patent: May 5, 2020

(54) APPARATUS AND METHOD FOR PREPARING GRAPHENE BY EXFOLIATION OF GRAPHITE USING A PULSED OR CAVITATING WATERJET

(71) Applicant: VLN Advanced Technologies Inc., Ottawa (CA)

(72) Inventors: Wenzhuo Yan, Ottawa (CA); Mohan Vijay, Ottawa (CA); Andrew Tieu, Ottawa (CA); Meisheng Xu, Ottawa (CA); Bruce Daniels, Ottawa (CA)

(73) Assignee: VLN Advanced Technologies Inc., Ottawa (CA)

( * ) Notice: Subject to any disclaimer, the term of this patent is extended or adjusted under 35 U.S.C. 154(b) by 537 days.

(21) Appl. No.: 15/641,865

(22) Filed: Jul. 5, 2017

(65) Prior Publication Data

US 2018/0009667 A1    Jan. 11, 2018

Related U.S. Application Data

(60) Provisional application No. 62/358,311, filed on Jul. 5, 2016.

(51) Int. Cl.
  *C01B 32/182* (2017.01)
  *C01B 32/19* (2017.01)
  *B02C 19/06* (2006.01)

(52) U.S. Cl.
  CPC ............ *C01B 32/182* (2017.08); *B02C 19/06* (2013.01); *B02C 19/065* (2013.01); *C01B 32/19* (2017.08)

(58) Field of Classification Search
  CPC ..... C01B 32/182; C01B 32/19; C01B 32/198; C01B 2204/00; C01B 2204/02;
  (Continued)

(56) References Cited

U.S. PATENT DOCUMENTS 7,594,614 B2    9/2009  Vijay et al.
8,297,540 B1 *  10/2012 Vijay ................. B05B 1/08
                                                   239/589

(Continued)

FOREIGN PATENT DOCUMENTS

CN       102249222      * 11/2013   ............ C01B 31/04
WO   WO-2005/042177 A1   5/2005
WO     WO 2015/099457   * 12/2014   ............ C01B 31/04

OTHER PUBLICATIONS

Machine Translation of CN 102249222A to Beihang University (Year: 2013).*

(Continued)

*Primary Examiner* — Daniel C. McCracken

(74) *Attorney, Agent, or Firm* — Schwegman Lundberg & Woessner, P.A.

(57) ABSTRACT

A graphene preparing apparatus for exfoliating graphite includes a high-pressure water pump for generating a high-pressure flow of water, a waterjet nozzle for receiving the water and for generating a pulsed or cavitating waterjet, a graphite supply vessel having a supply duct for supplying graphite powder, an exfoliation chamber that has a first inlet for receiving the waterjet and a second inlet for receiving the graphite powder, an outlet through which a graphite slurry is expelled from the exfoliation chamber, a filtering unit downstream of the exfoliation chamber for separating graphene from the slurry and a graphene collection tank for collecting the graphene.

13 Claims, 14 Drawing Sheets

(58) Field of Classification Search
CPC ............ C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B02C 19/065; B02C 19/06
See application file for complete search history.

(56) References Cited

U.S. PATENT DOCUMENTS

| | | | | |
|---|---|---|---|---|
| 2002/0054995 | A1* | 5/2002 | Mazurkiewicz | ........ B02C 19/06 428/364 |
| 2017/0166449 | A1* | 6/2017 | Yoo | ....................... C01B 32/184 |

OTHER PUBLICATIONS

"Canadian Application Serial No. 2,972,284, Office Action dated Aug. 14, 2018", 4 pgs.
"Canadian Application Serial No. 2,972,284, Response filed Oct. 16, 2018 to Office Action dated Aug. 14, 2018", 5 pgs.
"European Application Serial No. 17179852.3, extended European Search Report dated Nov. 22, 2017", 8 pgs.
"European Application Serial No. 17179852.3, Office Action dated May 17, 2019", 6 pgs.
"European Application Serial No, 17179852.3, Response filed Jul. 10, 2018 to extended European Search Report dated Nov. 22, 2017", 14 pgs.
Han, Joong Tark, et al., "Extremely Efficient Liquid Exfoliation and Dispersion of Layered Materials by Unusual Acoustic Cavitation", *Scientific Reports*, vol. 4, Article No. 5133, (2014), 1-7.
Shen, Zhigang, et al., "Preparation of graphene by jet cavitation", *Nanotechnology*, 22(36), 365306, (2011), 1-7.

* cited by examiner

APPARATUS AND METHOD FOR PREPARING GRAPHENE BY EXFOLIATION OF GRAPHITE USING A PULSED OR CAVITATING WATERJET

CLAIM OF PRIORITY

The application claims priority to U.S. Provisional Patent Application No. 62/358,311, filed Jul. 5, 2016, which is incorporated herein by reference in its entirety.

TECHNICAL FIELD

The present invention relates generally to graphene exfoliation and, more particularly, the exfoliation of graphene using a waterjet.

BACKGROUND

Graphene, comprising nanoparticles of carbon in single or a few layers of atoms thick, is made from graphite. These nanoparticles consist of small stacks of graphene that are 1 to 15 nanometers thick with diameters ranging from sub-micrometre to 100 micrometres. In addition to transparency and light absorption, it is the thinnest compound known to man at one atom thick, the lightest material, the strongest compound discovered, the best conductor of heat at room temperature and also the best conductor of electricity. Graphene is also flexible and capable of withstanding high stress. Therefore, it is very attractive for the application of flexible electronic devices, such as touch screens. Accordingly, there are considerable efforts to produce graphene in large quantities with good quality.

While high-quality graphene proved to be surprisingly easy to isolate in a small quantity, it is rather challenging to make a large quantity of graphene for commercial use. Common methods for preparing graphene fall into two categories: exfoliation and growth.

Exfoliation is a method of peeling (detaching) graphene layers from an existing graphite crystal. One exfoliation method is the Scotch Tape Method in which graphene is detached from a graphite crystal using an adhesive tape. Although this exfoliation method produces very high quality graphene (almost with no defects), it is labor-intensive and unsuitable for producing large amounts. The other exfoliation method is the so-called Dispersion of Graphite in which graphite crystal is dispersed in an organic solvent with nearly the same surface energy as the graphite. The energy barrier, which is required to overcome in order to separate the graphene layer, is reduced and easier for exfoliation. The solution is then subjected to an ultrasonic bath for an extended period of time. The quality of the graphene flakes obtained is very high, but size is small. However, this method enables preparing large amounts of graphene. Another method is the exfoliation of graphite oxide, which involves dispersing graphite oxide in water and then subjecting it to sonication or stirring. Graphene is then obtained by thermal or chemical methods. The performance of this method is similar to liquid-phase exfoliation, thus suitable for preparing large amounts, but quality is poor. Besides, this method employs complex equipment and involves chemicals which are not environmentally friendly.

Graphene can be grown directly from a substrate or added by chemical vapor deposition (CVD). Although these methods produce large amounts of graphene, they involve toxic chemicals and thus need complex equipment to control the process.

An improved method for preparing graphene is thus highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

The present invention provides a new and environmentally friendly ("green") method and apparatus for generating a large quantity of high quality graphene at low cost. This is realized by employing high-frequency high-pressure (HFHP) pulsed or cavitating waterjets (CWJ) in an exfoliation/mixing chamber. As the high-frequency modulated or cavitating waterjet emerges from the nozzle exit upstream of the exfoliation chamber, a high-frequency pulsed or cavitating waterjet is formed in the exfoliation chamber. Due to a specially designed structure of the chamber, a vacuum condition is generated. This vacuum pressure then draws the graphite powder by suction into the chamber at low to moderate speed. When the low-speed graphite powder (or slurry) collides with the high-speed waterjet, exfoliation occurs under conditions of high shear.

By controlling the waterjet pressure, nozzle size, and flow rate of the graphite powder into the chamber, a large quantity of graphene flakes are produced and may be collected at the downstream end of the chamber.

By separating exfoliated and un-exfoliated graphite using a high efficiency filtration module, graphene is collected in the tank and un-exfoliated graphite powder will be recirculated to the storage tank, and back to the exfoliation chamber for a second round of the process. Thus, the process may be continuous.

The main shearing action occurs in the exfoliation chamber where the high-speed waterjet encounters the low-speed graphite powder at an angle, for example 90 degrees, where one jet is used. Multiple jets can also be used to create even higher shearing.

In accordance with one aspect of the disclosure, a graphene preparing apparatus for exfoliating graphite includes a high-pressure water pump for generating a high-pressure flow of water, a waterjet nozzle for receiving the water and for generating a pulsed or cavitating waterjet, a graphite supply vessel having a supply duct for supplying graphite powder, an exfoliation chamber that has a first inlet for receiving the waterjet and a second inlet for receiving the graphite powder, an outlet through which a graphite slurry is expelled from the exfoliation chamber, a filtering unit downstream of the exfoliation chamber for separating graphene from the slurry and a graphene collection tank for collecting the graphene.

In accordance with another aspect of the disclosure, a graphene preparing apparatus for exfoliating graphite includes a high-pressure water pump for generating a high-pressure flow of water, a pressure vessel for receiving the water and providing a graphite slurry, a waterjet nozzle for receiving the graphite slurry into an exfoliation chamber incorporated within the waterjet nozzle and for exfoliating the graphite in the graphite slurry using a pulsed or cavitating waterjet generated by the waterjet nozzle, an outlet through which the graphite slurry is expelled from the waterjet nozzle, a filtering unit downstream of the waterjet for separating graphene from the slurry and a graphene collection tank for collecting the graphene.

In accordance with yet another aspect of the disclosure, a method of exfoliating graphite to make graphene entails steps, acts or operations of generating a high-pressure flow of water, generating a pulsed or cavitating waterjet using the high-pressure flow of water, supplying the graphite to an exfoliation chamber and exfoliating the graphite in the exfoliation chamber using the pulsed or cavitating waterjet.

BRIEF DESCRIPTION OF DRAWINGS

Further features and advantages of the embodiments of the present invention will become apparent from the following description taken in combination with the appended drawings, in which.

DETAILED DESCRIPTION OF EMBODIMENT(S)

Figure 1A:
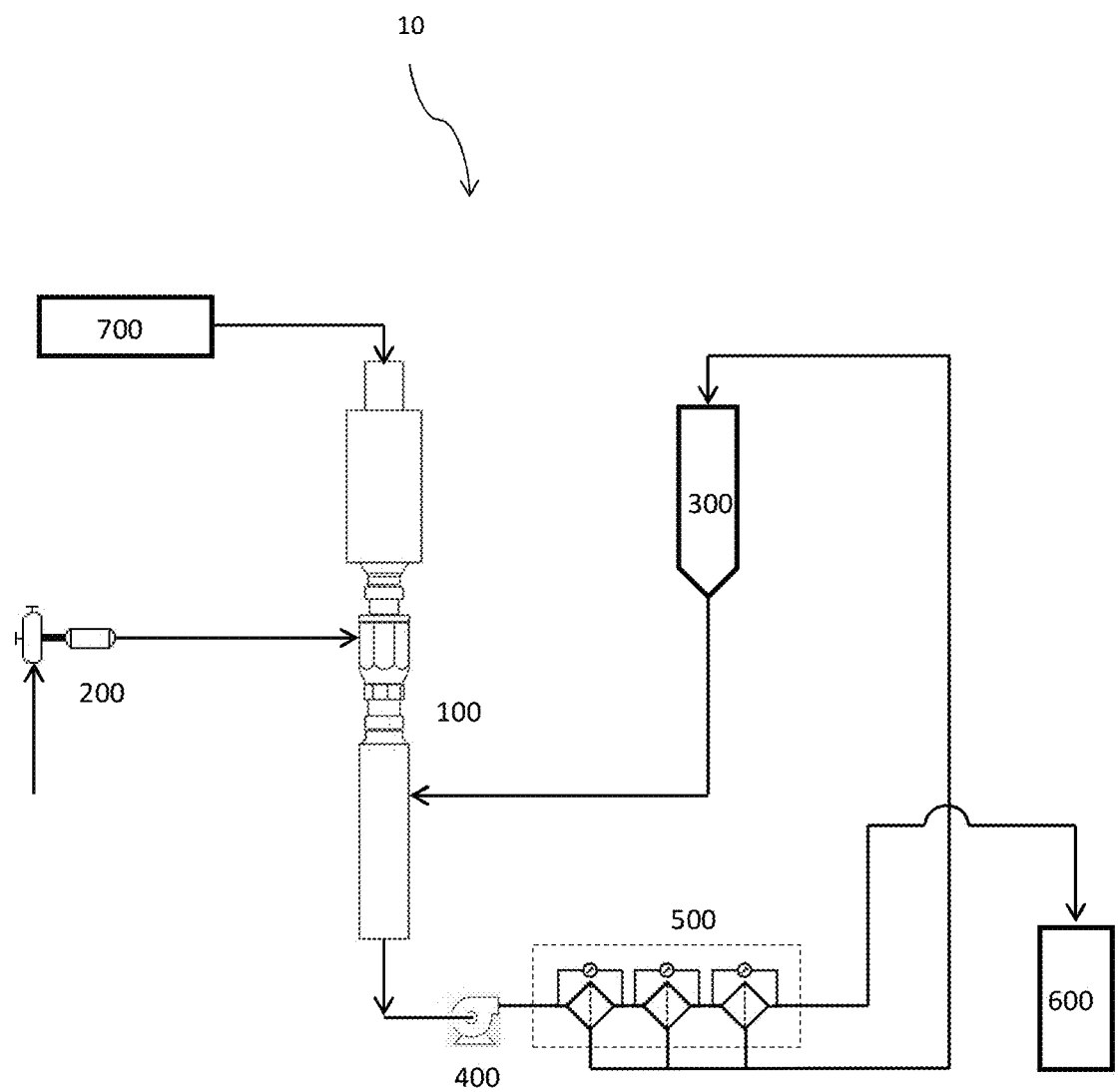
FIG. 1A is a schematic diagram of a graphene preparing apparatus in accordance with an embodiment of the present invention.

In general, and by way of overview, the present invention provides an apparatus and a method for exfoliating graphite to produce graphene. The apparatus and method enable a large quantity of good quality graphene to be produced.

FIG. 1 schematically depicts a graphene preparing apparatus (or system) generally denoted by reference numeral 10 for exfoliation of graphite, e.g. graphite crystal powder, in accordance with an embodiment of the present invention. The apparatus 10 shown by way of example in FIG. 1 includes a high-pressure water pump 200 configured to supply a high-pressure flow of water, e.g. at pressures from 2 kpsi up to 30 kpsi and flow rates of the order of 5 to 15 usgal/min. The apparatus 10 of FIG. 1 includes an exfoliation module 100. The exfoliation module 100 includes a waterjet nozzle, e.g. a high-frequency pulsed waterjet nozzle, and an exfoliation chamber connected to, and in fluid communication with, a downstream end of the nozzle. An ultrasonic generator 700 generates an ultrasonic signal to drive an ultrasonic transducer made of a piezoelectric crystal or, alternatively, made of a magnetostrictive material. The ultrasonic transducer is connected to a microtip in the pulsed waterjet nozzle. A graphite powder storage and supply vessel 300 supplies graphite powder to the exfoliation chamber. The powder may be supplied as dry powder or as a slurry of water and graphite powder. The waterjet exfoliates the graphite to produce graphene inside the exfoliation chamber. A slurry pump 400, e.g. a centrifugal pump is disposed downstream of the exfoliation chamber to pump the slurry expelled from the chamber to a filtration unit (or filtering unit) 500, e.g. a high efficiency bio-filter unit (500), that is disposed downstream of the pump 400. The filtration unit 500 filters or separates the exfoliated graphene from the slurry. Downstream of the filtration unit 500 is a graphene collection tank 600 which collects the graphene produced by the apparatus. In other embodiments, the apparatus employs a cavitating waterjet.

The ultrasonic nozzle may be of the type disclosed by Vijay et al. in U.S. Pat. No. 7,594,614. That nozzle generates high frequency pulsed waterjet by modulating the continuous waterjet generated by the high pressure pump 200. The pulsed waterjet, at speeds up to 500 m/s depending upon the operating pressure, travels into the exfoliation chamber to exfoliate the graphite to form the graphene. Although the frequency of the ultrasonic vibration can vary from 5 kHz to 100 kHz, the most practical range is from 20 kHz to 40 kHz.

In the embodiment employing a cavitating nozzle, excellent results can be obtained using a reverseflow cavitating (RFC) nozzle such as the ones shown in U.S. Pat. No. 8,297,540.

Figure 1B:
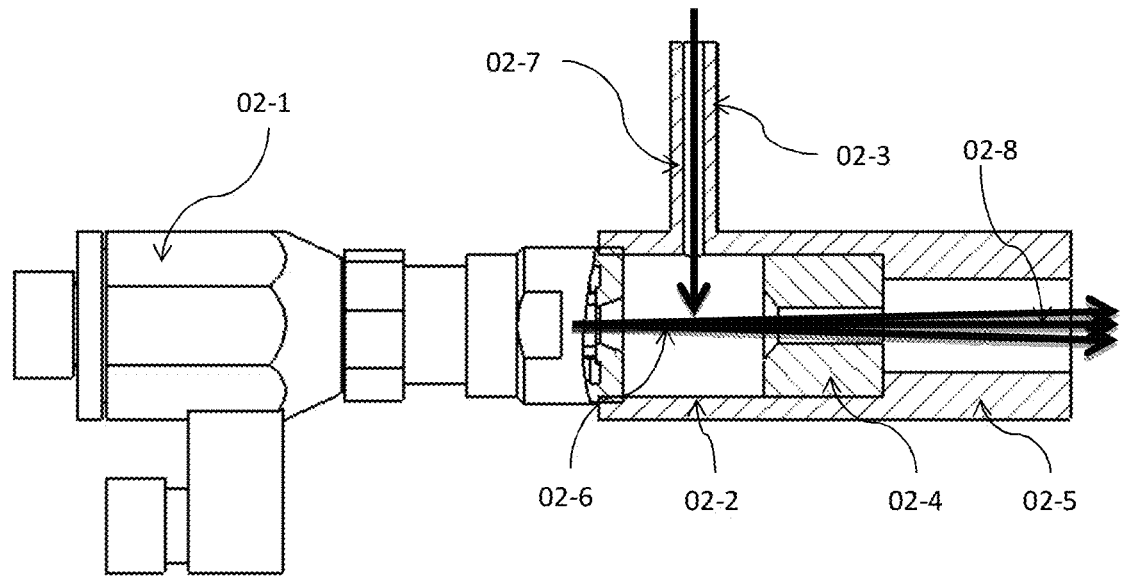
FIG. 1B is a partial cross-sectional view of a pulsed nozzle for use in the graphene preparing apparatus of FIG. 1A.
Figure 1C:
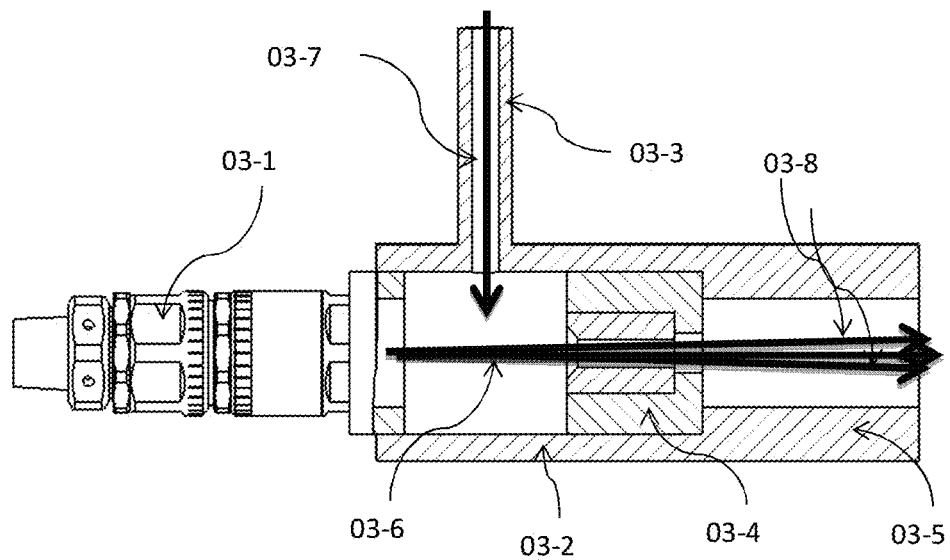
FIG. 1C is a partial cross-sectional view of a cavitating nozzle for use in the graphene preparing apparatus of FIG. 1A.

Referring to FIGS. 1A, 1B and 1C, the graphite exfoliation apparatus 10 includes either a pulsed waterjet nozzle (FIG. 1B) or a cavitating waterjet nozzle (FIG. 1C). Both are capable of producing graphene flakes from graphite powder, employing shear effects generated by the high frequency high pressure pulsed waterjet or cavitating waterjet.

Referring to FIGS. 1B and 1C, a high-frequency high-pressure pulsed waterjet 02-6 or a cavitating waterjet 03-6 is produced in the respective nozzle (02-1 for a pulsed jet or 03-1 for a cavitating jet). The Venturi effect generated by the waterjet (02-6 or 03-6) in the exfoliation chamber (02-2 or 03-2) produces a vacuum condition which sucks graphite powder (02-7 or 03-7) through the feed tube (02-3 or 03-3) connected to the graphite storage vessel 300 into the chamber (02-2 or 03-2), where it collides with the jet and exfoliates into graphene flakes. Insert (02-4 or 03-4) functions as a choking device to control the degree of vacuum required for sucking the graphite powder. The slurry consisting essentially of graphene (e.g. graphene flakes) and graphite powder (02-8 or 03-8) and water flows out of the chamber through the exit tubing (02-5 or 03-5) (or "outlet") into the filtration unit 500 where the slurry is separated into graphene flakes.

Figure 2A:
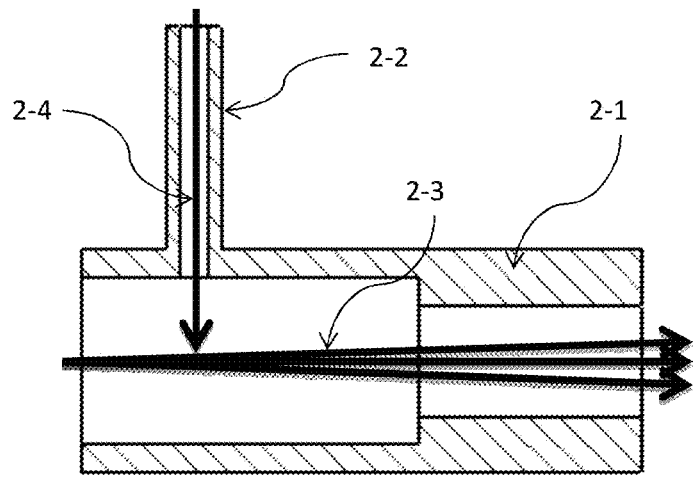
FIG. 2A is a schematic diagram showing a first configuration of an exfoliation chamber with a 90-degree inlet port angle.
Figure 2D:
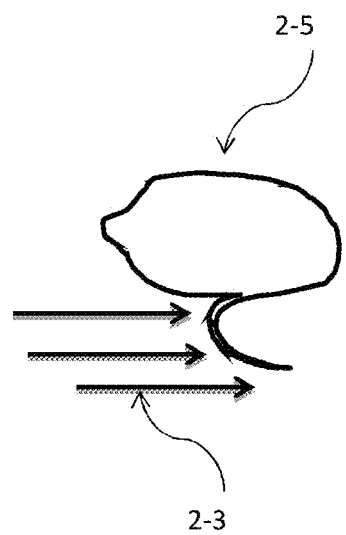
FIG. 2D is a schematic depiction of the mechanism of exfoliation of graphite powder.

FIG. 2A shows a method of injecting graphite slurry into the exfoliation chamber. While the high pressure high frequency pulsed or cavitating waterjet 2-3 travels into the exfoliation chamber 2-1, a controlled stream of graphite slurry 2-4 is introduced into the exfoliation chamber through a port 2-2. As the graphite slurry 2-4 at low speed approaches the high speed pulsed or cavitating waterjet 2-3, the individual particles of graphite crystal 2-5 are sliced into thin flakes, as shown in FIG. 2D. The effectiveness of the slicing action within the exfoliation chamber depends upon the relative speed difference between the pulsed or cavitating waterjet and graphite slurry, the frequency of the pulses (or, intensity of cavitation bubbles), the angle of the port that the slurry is introduced, and the flow rates of the two streams. The angle of graphite injection can be 90 degrees, as shown in FIG. 2A, or can be larger (FIG. 2B) or smaller (FIG. 2C) than 90 degrees to form a relative motion against the waterjet.

Figure 2B:
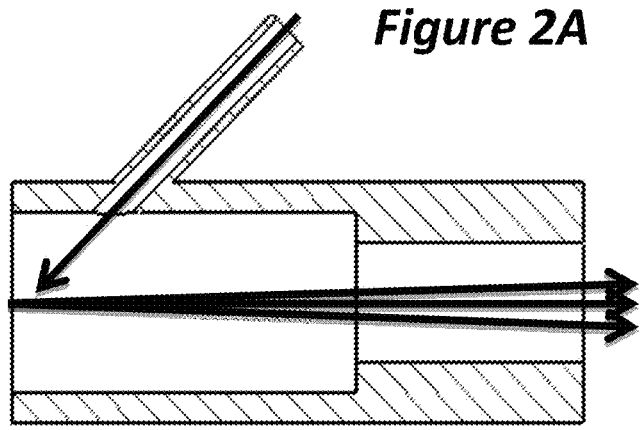
FIG. 2B is a schematic diagram showing a second configuration of an exfoliation chamber with a rearwardly angled inlet port.
Figure 2C:
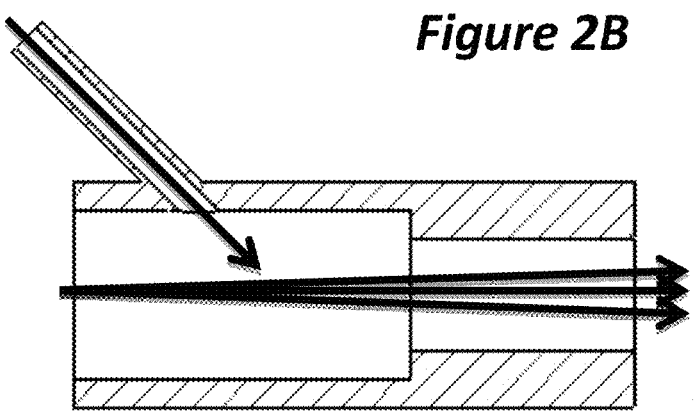
FIG. 2C is a schematic diagram showing a third configuration of an exfoliation chamber with a forwardly angled inlet port.

As shown in FIG. 2B and the following figures, the smaller diameter portion of the exfoliation chamber 2-1 serves as a choking device to produce a vacuum (negative pressure) in the exfoliation chamber by the Venturi effect. The vacuum (negative pressure) enhances the flow of graphite slurry into the chamber. However, a positive pressure feeding device is also possible. The flow rate of the graphite slurry is controlled by a choking valve (not shown) in the feed line 2-2.

Figure 3:
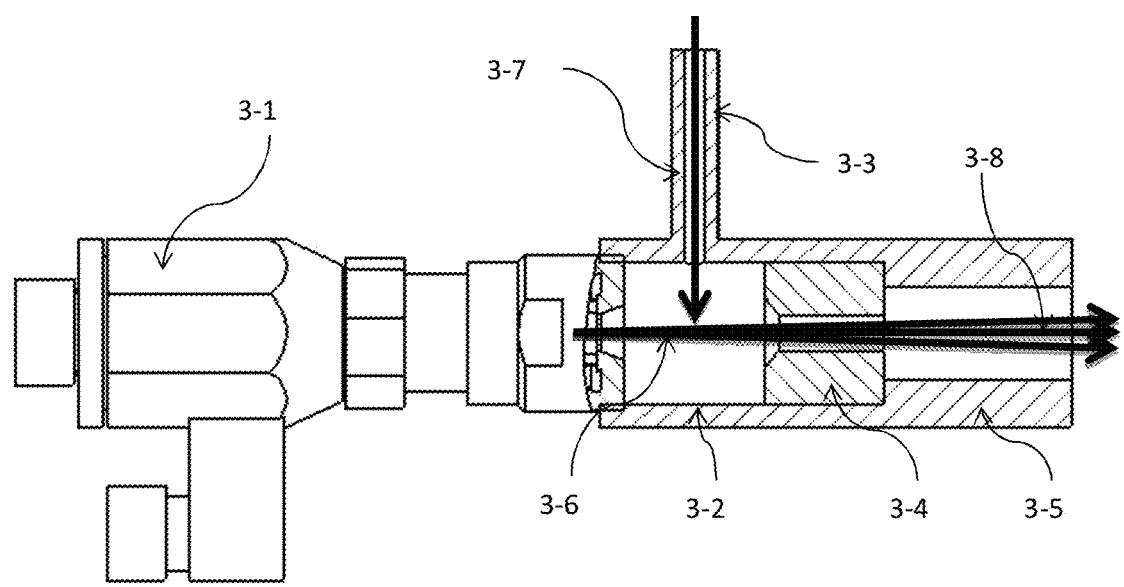
FIG. 3 is a cross-sectional view of a graphene exfoliation chamber with one jet, showing the details of the structure of the chamber where shearing action takes place.

FIG. 3 illustrates an exfoliation chamber with a 90-degree port for use with either a pulsed or cavitating waterjet nozzle. The nozzle is attached at the inlet to the exfoliation chamber. The choking element 3-4 that generates the Venturi effect is shown in the figure.

Figure 4:
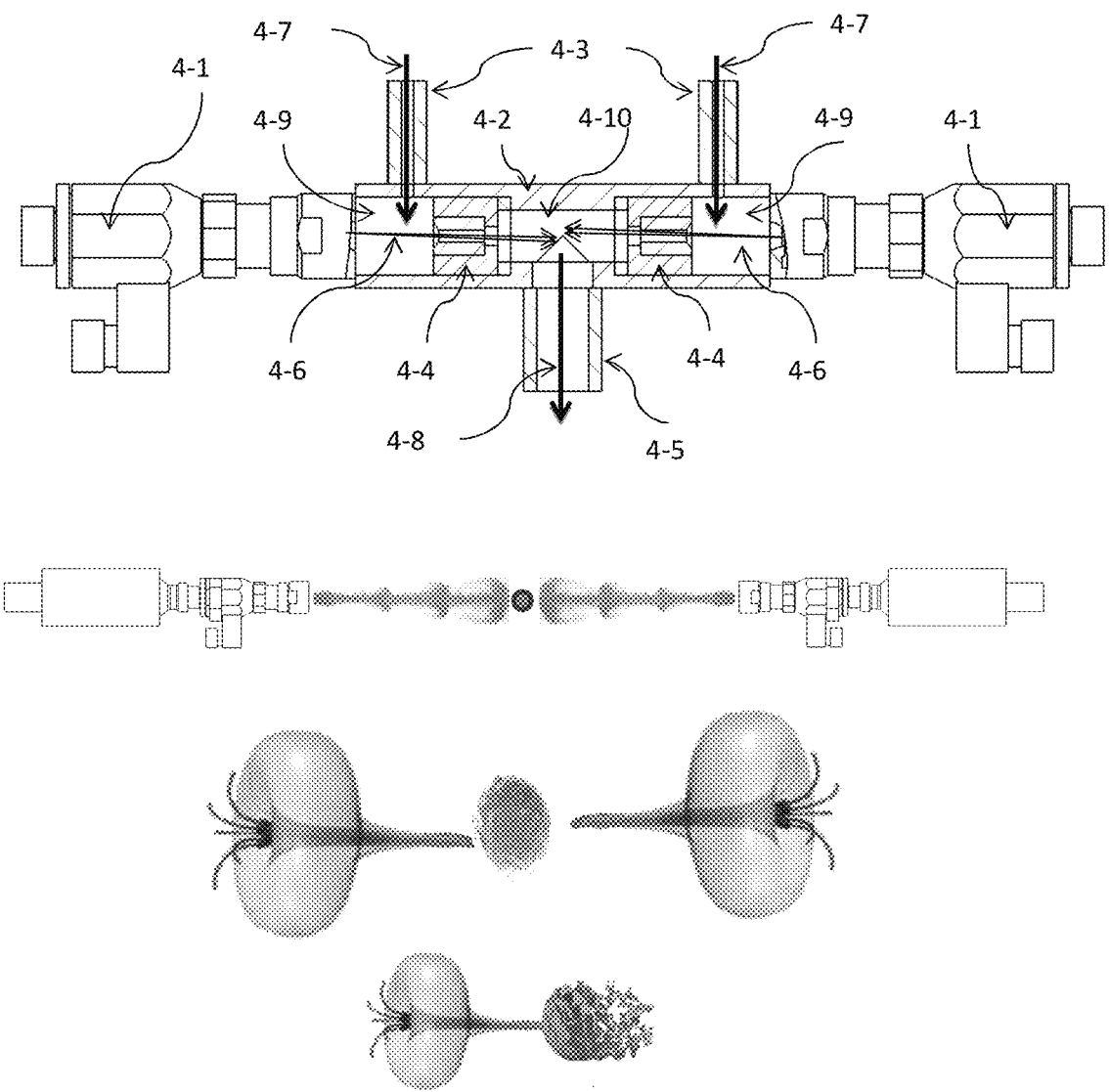
FIG. 4 is a cross-sectional view of a graphene exfoliation chamber with two jets, showing the details of the structure of the chamber where first and second shearing actions take place, the figure also showing the mechanism of exfoliation by microjets formed in the process of cavitation bubbles collapsing.

FIG. 4 illustrates an embodiment having two pulsed waterjets or two RFC nozzles 4-1 placed at opposite ends of the exfoliation chamber 4-2. The exfoliation action happens primarily in the primary exfoliation chambers 4-9 on either side of the choking valves 4-4, where high pressure waterjets 4-6 meet the graphite slurry 4-7. This is the primary exfoliation process. The waterjets mixed with the graphite slurry travel through the choking valves 4-4, into another chamber 4-10, called a secondary exfoliation chamber. Here the shearing action further intensifies and the combined slurry 4-8 exits the chamber through port 4-5, flowing to the filter unit. By carefully placing the opposing waterjet nozzles at slightly offset center angles, the shearing action can be optimized. This shearing action is the secondary exfoliation. The exfoliation action in the primary exfoliation chamber can be controlled by selecting the distance between the graphite inlet 4-3 and the exit orifice of the nozzles 4-1, and the distance between the choking valves 4-4 and the nozzles 4-1. The chamber diameter also serves as a control parameter for optimizing the exfoliation in the primary exfoliation chamber. The diameter of the choking valve 4-4 is carefully designed to control the vacuum (negative pressure), as well as the size of the first waterjet before it meets the second (opposing) waterjet. The length and diameter of the secondary exfoliation chamber are also important in controlling the exfoliation action and thus the quality of the graphene produced. The lower portion of FIG. 4 shows another mechanism of exfoliation by microjets produced by the implosion of cavitation bubbles generated by the pulsed jets.

Figure 5:
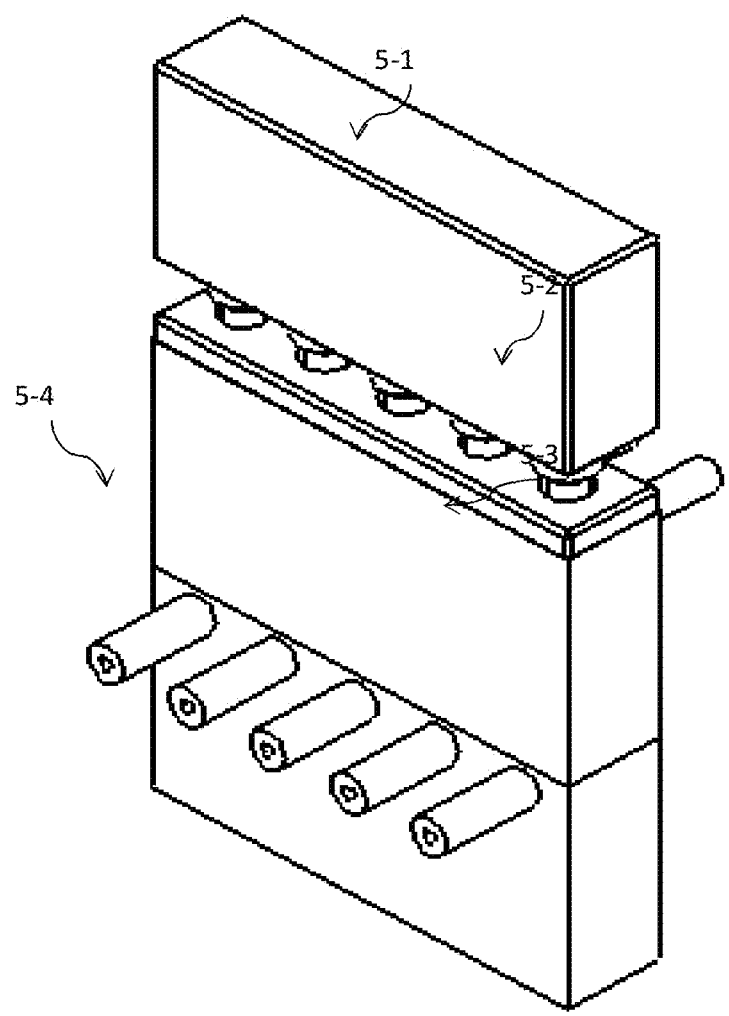
FIG. 5 is an isometric view of a multiple jet exfoliator featuring one ultrasonic horn with five microtips.
Figure 6:
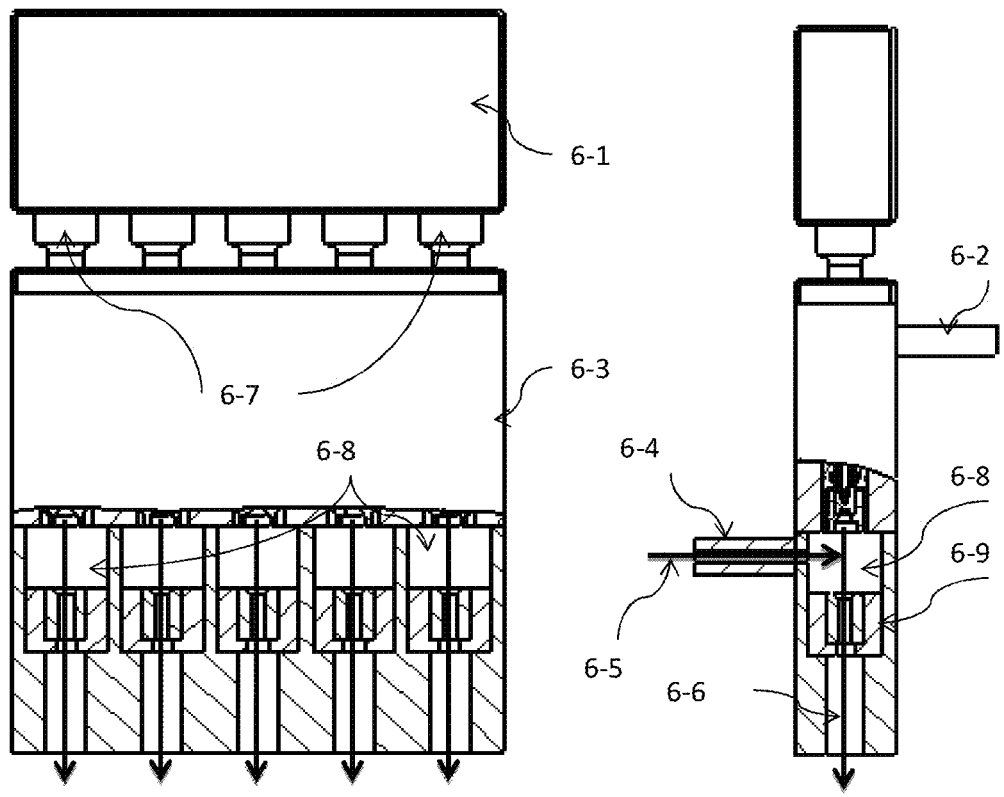
FIG. 6 is a cross-sectional view of a graphene exfoliation chamber with five jets, showing the details of the structure of the chamber where shearing action takes place.

FIGS. 5 and 6 show yet another embodiment with multiple pulsed waterjet nozzles. Shown in these figures, by way of example, are five parallel nozzles with corresponding exfoliation chambers. An ultrasonic coupler (5-1) energizes the multiple ultrasonic microtips, which are depicted under the coupler. These ultrasonic microtips modulate the high-pressure water entering the mixing chamber (5-3) through the inlet (5-2). High-frequency ultrasonic pulses are generated in the mixing chamber. Although the configuration depicts the use of ultrasonic nozzles, it can also use multiple cavitating waterjet nozzles, for example, reverseflow cavitation (RFC) nozzles.

FIG. 6 is a cross-sectional view of the configuration illustrated in FIG. 5. The ultrasonic coupler (6-1) energizes multiple ultrasonic microtips (6-7) which modulate and produce high frequency pulses of water in the mixing chamber (6-3) by modulating the high pressure water entering the mixing chamber through the inlet port (6-2). Multiple pulsed jets (6-6) enter the exfoliation chambers 6-8. In the exfoliation chambers 6-8, the graphite slurries (6-5) meet the high-frequency pulses of water (6-6) and the exfoliations occur. Once again, the height and diameter of the exfoliation chambers 6-8, the height and diameter of the choking valve 6-9 are important parameters in controlling the exfoliation process. This configuration can also be implemented using cavitating nozzles.

Figure 7:
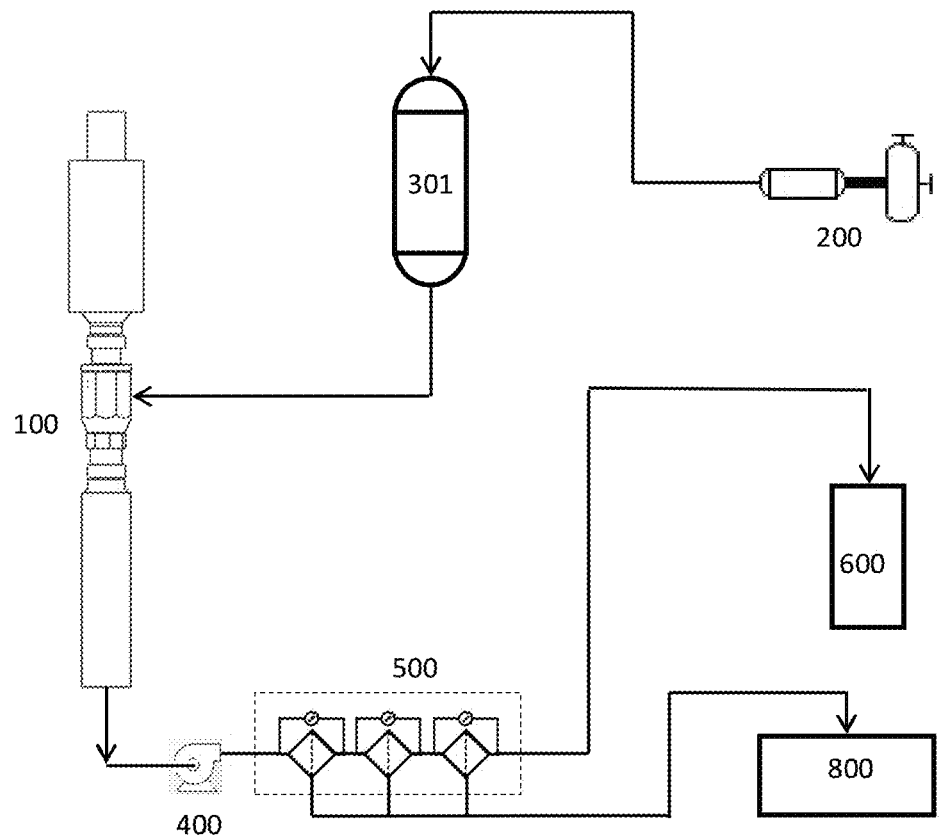
FIG. 7 is a schematic diagram of a graphene exfoliation apparatus with a suspension jet having a single high pressure high frequency pulsed or cavitating waterjet nozzle connected to a single exfoliation chamber, a high pressure water jet pump, a graphite powder feeding vessel, a high efficiency filtration unit, and a graphene collection tank, in accordance with another embodiment of the present invention.

FIG. 7 is yet another embodiment of an exfoliation apparatus. The apparatus of FIG. 7 employs a pulsed suspension waterjet. The apparatus includes a high-pressure water pump 200 to supply a flow of high-pressure water, e.g. at pressures from 2 kpsi up to 15 kpsi and a flow rate of the order of 5 to 15 usgal/min. The apparatus includes a high-frequency pulsed or cavitating waterjet nozzle with exfoliation chamber 100, a pressure vessel 301 which mixes graphite particles with high-pressure water to produce a suspension of the particles in water, a filtering unit 500, e.g. a high efficiency bio-filter, and a graphene collection tank 600. Unlike the apparatus described in FIG. 1, this suspension waterjet based exfoliation apparatus does the primary exfoliation inside the nozzle assembly 100 as opposed to the exfoliation chamber. This is achieved by mixing the graphite crystal powder in the pressurized mixing vessel 301. The pressurized water/graphite powder mixture (suspension) is then transferred through a high-pressure line into the nozzle 100, where exfoliation occurs. The suspension which is not exfoliated is collected in the tank 800 and fed back to the pressure vessel 301. This method can also be implemented using cavitating nozzles such as the RFC nozzles. In the embodiment depicted by way of example in FIG. 7, the apparatus also includes a graphite collection tank 800 in addition to the graphene collection tank 600. Graphite (i.e. the graphite slurry) from the graphite collection tank 800 may optionally be recycled for further processing, i.e. to further exfoliate the graphite to obtain graphene.

Figure 8A:
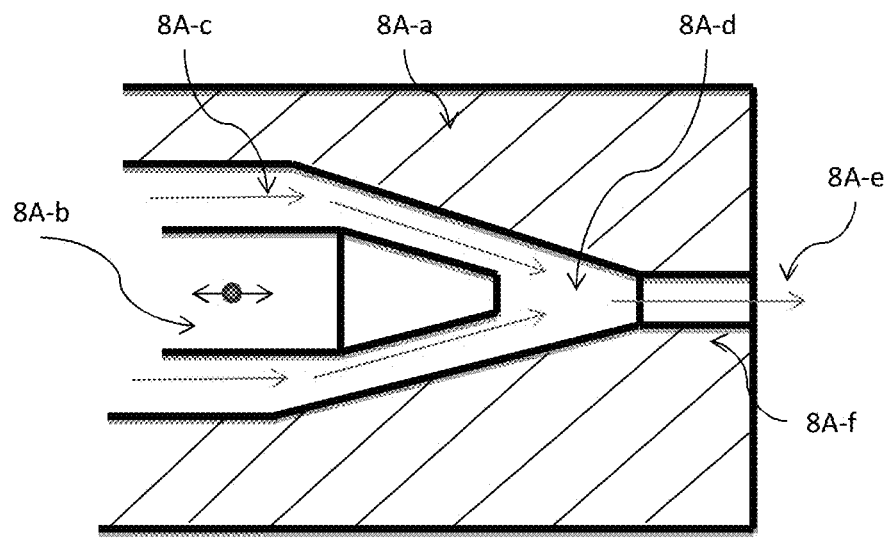
FIG. 8A is a schematic depiction of the nozzle with the ultrasonic microtip upstream of the exfoliation chamber where high pressure high frequency pulsed waterjet forms.

FIG. 8A is a schematic diagram showing the primary exfoliation process. The tip of the ultrasonic microtip (8A-*b*) vibrates at high frequency ranging from 5 kHz to 40 kHz (practical range). The high-pressure suspension slurry (8A-*c*) consisting essentially of water and graphite powder enters the annular space between the outside surface of the ultrasonic microtip and the inside surface of the nozzle (8A-*a*). The decreasing area of the annulus (i.e. annular space) from the entrance to the upstream of the orifice (8A-*f*) accelerates the suspension to a very high speed at the mixing region (8A-*d*) which is the region disposed immediately downstream of the microtip. Here two separate mechanisms enhance the exfoliation process. The first one is due to the intense shear stresses caused by the velocity gradient and the second mechanism is cavitation. The high shear stresses break the graphite powder into smaller flakes. In the mixing region (8A-*d*), the pressure fluctuates rapidly due to the vibration of the microtip at high frequencies. Intense cavitation occurs in this region due to each cycle of pressure variation. During the negative half-cycle of pressure, cavitation bubbles form and grow. When the pressure changes to half-positive cycle, cavitation bubbles begin to collapse, generating very high speed microjets as depicted in FIG. 4. Exfoliation of graphite particles occurs due to the impact of microjets.

Figure 8B:
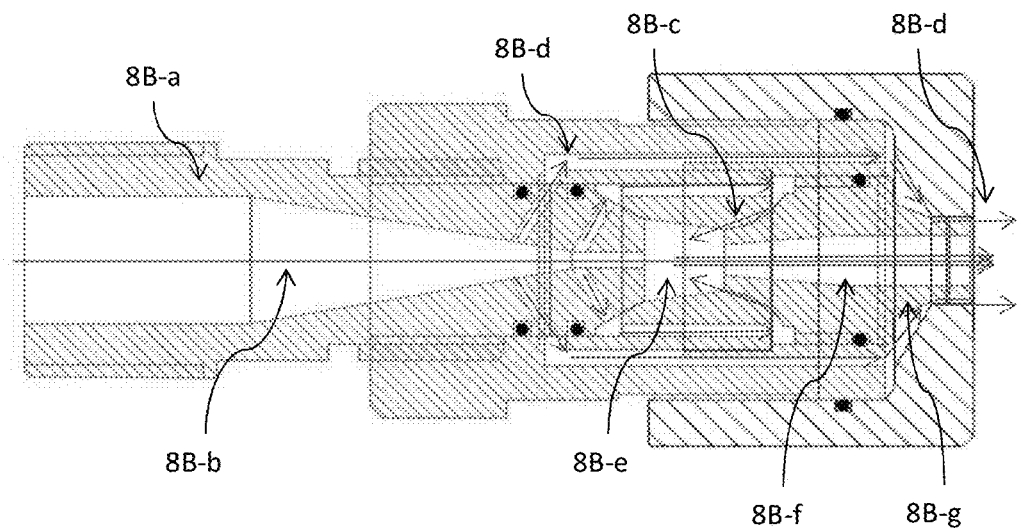
FIG. 8B is a cross-sectional view of a reverseflow cavitating nozzle as one example of a cavitation nozzle that may be disposed upstream of the exfoliation chamber in which cavitation bubbles are formed by the adverse shearing action in the turbulent mixing layers of the main jet and the reverseflow annular jet and travel into the exfoliation chamber.

FIG. 8B is a schematic diagram showing the exfoliation action in one type of cavitating nozzle, the reverseflow cavitation (RFC) nozzle shown in U.S. Pat. No. 8,297,540. This RFC nozzle has three streams of flow. The main (central) stream (8B-*b*), with graphene powder, the reverse stream (8B-*c*) and the surrounding shroud stream (8B-*d*). The reverse flow stream (8B-*c*) flows in the reverse direction of the main jet in the mixing chamber (8B-*e*) where profuse cavitation bubbles are expected to occur due the intense adverse shear stress between the two streams. Similar to the pulsed suspension jet described in FIG. 8A, there are two separate mechanisms for exfoliation of graphite. The first one is due to the intense shearing action in the mixing layers of the two streams and, the second mechanism is due to cavitation bubble collapse in the exfoliation chamber and along the way as the jet (8B-*f*) travels down to the nozzle exit (8B-*g*). The shroud stream (8B-*d*) confines and directs the mixture of graphene, unprocessed graphite into the graphene and graphite collection tanks (600 and 800 in FIG. 7).

Figure 9:
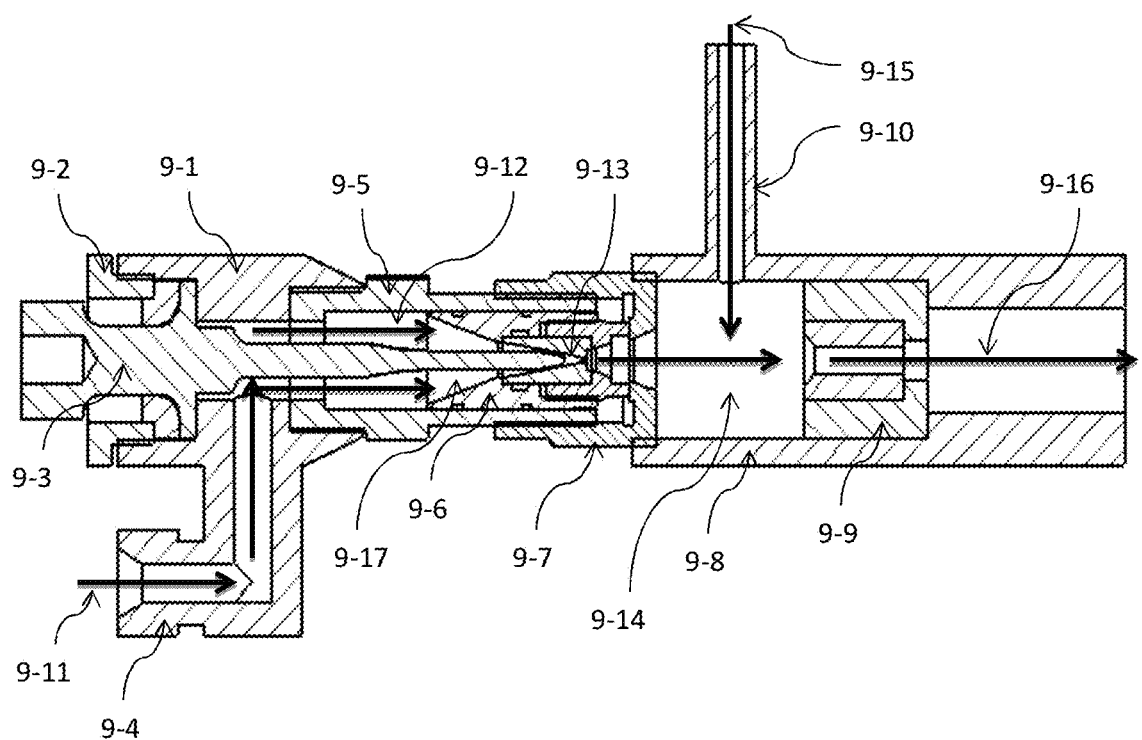
FIG. 9 is a cross-sectional view of a graphene exfoliation unit with a single suspension jet shown with a pulsed waterjet nozzle.

FIG. 9 shows a cross-sectional view of the suspension waterjet exfoliation apparatus with a single pulsed waterjet nozzle. Graphite powder suspension slurry 9-11 enters the primary exfoliation chamber 9-17 through water inlet port 9-4 of ultrasonic nozzle 9-1. The ultrasonic microtip 9-3, driven by a piezoelectric transducer (not shown), and held in place by a nut 9-2, vibrates at high frequency. In a small region (9-13) downstream of the microtip, pressure fluctuates cyclically and cavitation bubbles are generated. When the graphite suspension slurry flows through this region, which is bounded by the microtip (9-3), the nozzle insert 9-13, holder 9-6, and the tube 9-5, the graphite suspension slurry is subjected to shearing action as a result of the velocity gradient and the collapsing of cavitation bubbles. As the suspension jet passes through the nozzle orifice and enters into the secondary exfoliation chamber 9-14, a stream of low pressure air or water 9-15 is injected into the chamber through the port 9-10 to cause further agitation of the suspension jet. This agitation enhances exfoliation of graphite particles. The choking element 9-9 generates a vacuum to draw air or water into the chamber. The resultant suspension jet 9-16 is directed into the filtering system and graphene collecting tank. In another embodiment of this configuration, an RFC nozzle can also be used for exfoliation.

Figure 10:
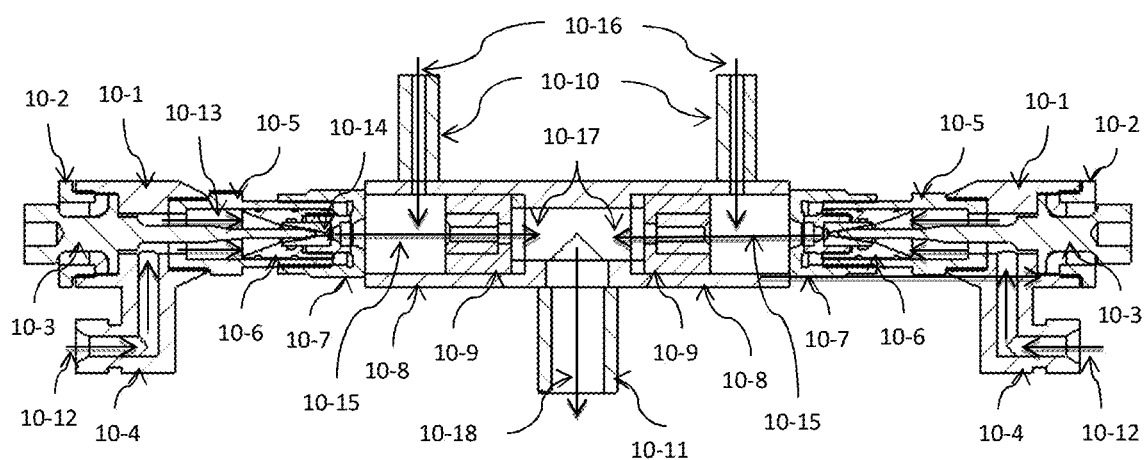
FIG. 10 is a cross-sectional view of a graphene exfoliation chamber with two suspension jets shown with pulsed waterjet nozzles.

FIG. 10 depicts another embodiment of an exfoliation apparatus. In the apparatus depicted in FIG. 10, there are two pulsed waterjet nozzles. The primary and secondary exfoliation chambers are the same as described in FIG. 9 and FIG. 4. In the chamber where the two jets (10-17) meet further exfoliation occurs and the combined suspension jet 10-18 exits the chamber through port 10-11. Two RFC nozzles can also be used in this configuration to exfoliate a graphite suspension slurry.

Figure 11:
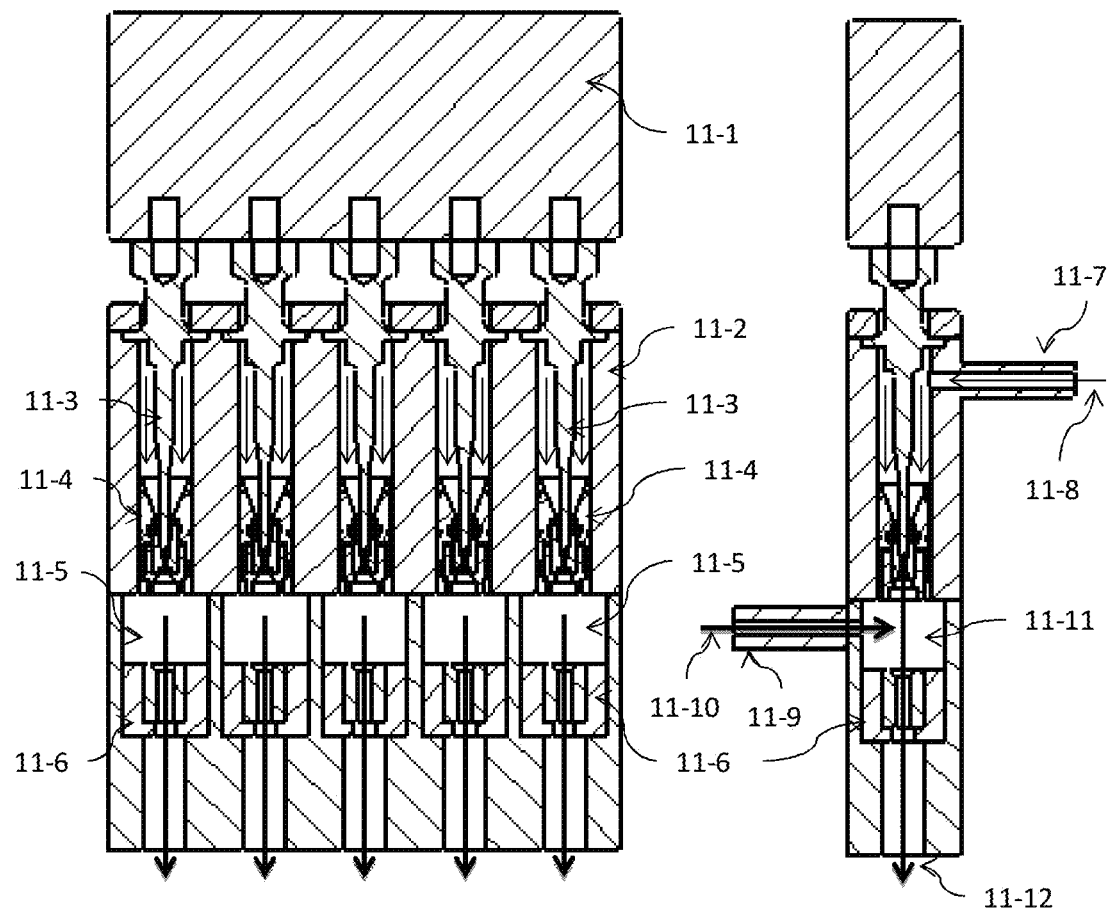
FIG. 11 is a cross-sectional view of a graphene exfoliation chamber with five suspension jets, showing the details of the structure of the chamber where shearing action occurs.

FIG. 11 shows yet another embodiment of an exfoliation apparatus with multiple exfoliation chambers for exfoliation of a suspension waterjet. Although any number of exfoliation chambers can be employed, five exfoliation chambers are illustrated as an example. An ultrasonic coupler 11-1 drives multiple microtips 11-3 (five in this example). The annular space bounded by the outside surface of the microtip 11-3, the nozzle insert 11-4 and the chamber body 11-2, serves as the primary exfoliation chamber. As described previously, primary exfoliation occurs here under the shearing action and cavitation bubble collapse when the suspension slurry 11-8 enters the chamber through port 11-7. Downstream in the secondary chamber 11-11, low pressure air or water 11-10 is introduced through port 11-9 for further agitation of the suspension. The resultant jet stream 11-12 is then directed into the filtering unit and graphene collection tank.

Figure 12:
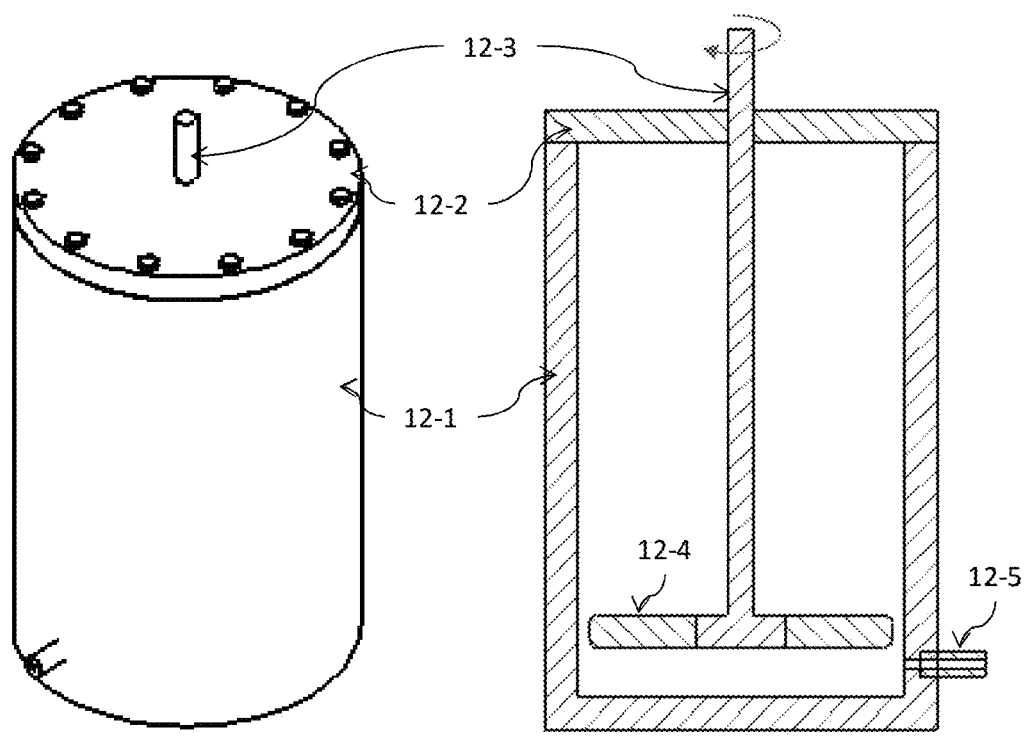
FIG. 12 depicts a high pressure vessel for storing graphite powder, a feeding unit and a stirrer for uniform mixing of graphite powder.

FIG. 12 shows a pressure vessel 12-1 with an agitator fitted with vanes 12-4. The vessel 12-1 designed for a maximum pressure 20 kpsi is meant to store the suspension slurry of graphite. In order to generate homogeneous suspension, the shaft 12-3 is rotated by an external motor (not shown) at moderate rotational speeds. The vanes 12-4 ensure uniform mixing. The suspension is then transported through port 12-5 at the bottom of the vessel at a controlled flow rate to the nozzle assembly in suspension waterjet exfoliation apparatus described in FIG. 9, FIG. 10, and FIG. 11.

Figure 13:
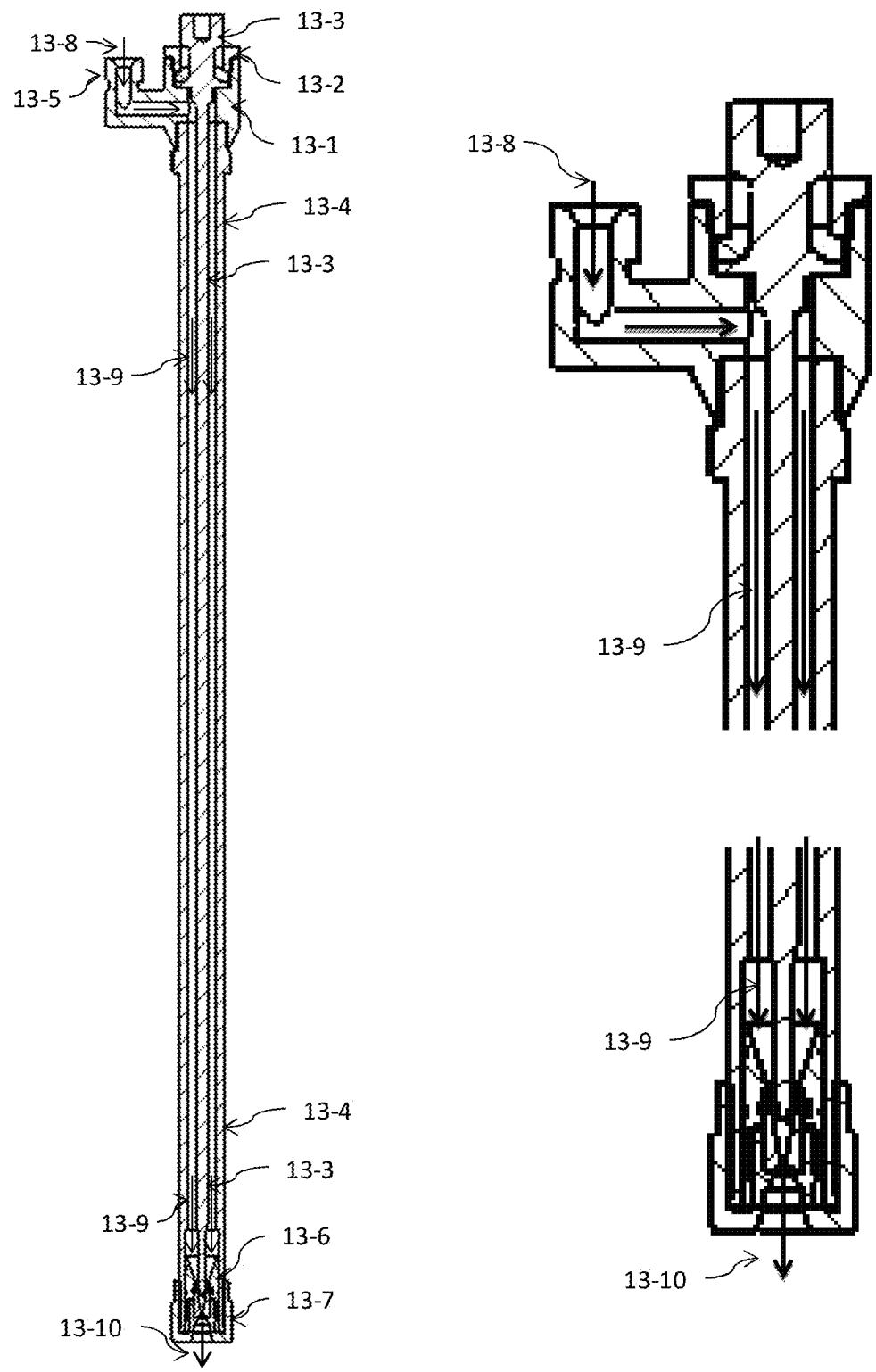
FIG. 13 is a cross-sectional view of a graphene exfoliation apparatus with a suspension jet with a long horn.

FIG. 13 shows a long slim nozzle configuration for exfoliation of suspension waterjet type. A long slender acoustically tuned microtip, 13-3 (6 in # length # 300 in), connected to the mixing chamber 13-1 by a nut 13-2, extends from the chamber to the end of the tube 13-4, where a nozzle insert 13-6 is connected with a threaded cap 13-7. Graphite slurry 13-8, transported through a tubing from high pressure mixing vessel (12-1, FIG. 12), enters into the long narrow annular space between the long microtip 13-3 and the casing tube 13-4. Due to resonant vibration of the long microtip and water column inside the annular space, the graphite suspension is subjected to intense shear stresses. Downstream of the microtip 13-3 a small region exists where cavitation occurs due to cyclic pressure fluctuations. This is the region where further exfoliation occurs due to the collapse of cavitation bubbles.

The embodiments of the invention described above are intended to be exemplary only. As will be appreciated by those of ordinary skill in the art, to whom this specification is addressed, many variations can be made to the embodiments presented herein without departing from the scope of the invention. The scope of the exclusive right sought by the applicant is therefore intended to be limited solely by the appended claims.

It is to be understood that the singular forms "a", "an", and "the" include plural referents unless the context clearly dictates otherwise. Thus, for example, reference to "a device" includes reference to one or more of such devices, i.e., there is at least one device. The terms "comprising", "having", "including", and "containing" are to be construed as open-ended terms (i.e., meaning "including, but not limited to,") unless otherwise noted. All methods described herein can be performed in any suitable order unless otherwise clearly contradicted by context. The use of examples or exemplary language (e. g., "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other example of change, substitutions, and alterations are ascertainable by one skilled in the art and could be made without departing from the scope disclosed herein.

What is claimed is:

1. A graphene preparing apparatus for exfoliating graphite, the apparatus comprising:
   a high-pressure water pump for generating a high-pressure flow of water;
   a waterjet nozzle for receiving the water and for generating a pulsed or cavitating waterjet;
   a graphite supply vessel having a supply duct for supplying graphite powder;
   an exfoliation chamber that has a first inlet for receiving the waterjet and a second inlet for receiving the graphite powder;
   an outlet through which a slurry is expelled from the exfoliation chamber;
   a filtering unit downstream of the exfoliation chamber for separating graphene from the slurry; and
   a graphene collection tank for collecting the graphene.

2. The apparatus as claimed in claim 1 wherein the waterjet nozzle is an ultrasonically pulsed waterjet nozzle for generating a high-frequency pulsed waterjet.

3. The apparatus as claimed in claim 1 wherein the waterjet nozzle is a reverse-flow cavitating nozzle.

4. The apparatus as claimed in claim 1 wherein the exfoliation chamber comprises a flow-choking insert to create a Venturi effect to suck the graphite powder through the second inlet.

5. The apparatus as claimed in claim 1 further comprising a slurry pump disposed between the outlet and the filtering unit to pump the slurry to the filtering unit.

6. The apparatus as claimed in claim 1 comprising two opposed nozzles, each nozzle having a primary exfoliation chamber, the nozzles sharing a secondary exfoliation chamber and a common outlet.

7. The apparatus as claimed in claim 1 further comprising a plurality of parallel exfoliation chambers and a plurality of parallel ultrasonically modulated nozzles driven by a common ultrasonic coupler connected to a common ultrasonic generator.

8. A graphene preparing apparatus for exfoliating graphite, the apparatus comprising:
   a high-pressure water pump for generating a high-pressure flow of water;
   a pressure vessel for receiving the water and providing a graphite slurry;
   a waterjet nozzle for receiving the graphite slurry into an exfoliation chamber incorporated within the waterjet nozzle and for exfoliating the graphite in the graphite slurry using a pulsed or cavitating waterjet generated by the waterjet nozzle;
   an outlet through which the graphite slurry is expelled from the waterjet nozzle;
   a filtering unit downstream of the waterjet for separating graphene from the slurry; and
   a graphene collection tank for collecting the graphene.

9. The apparatus as claimed in claim 8 further comprising a secondary exfoliation chamber at the exit of the waterjet nozzle.

10. The apparatus as claimed in claim 9 further comprising a flow-choking insert in the secondary exfoliation chamber to create a Venturi effect.

11. The apparatus as claimed in claim 8 wherein the waterjet nozzle is an ultrasonically pulsed waterjet nozzle for generating a high-frequency pulsed waterjet.

12. The apparatus as claimed in claim 8 wherein the waterjet nozzle is a reverse-flow cavitating nozzle.

13. The apparatus as claimed in claim 8 further comprising a slurry pump disposed between the outlet and the filtering unit to pump the slurry to the filtering unit.

* * * * *